Feb. 11, 1941.  C. O. NORMAN  2,231,293
VEHICLE CANOPY
Filed Oct. 12, 1939  2 Sheets-Sheet 1
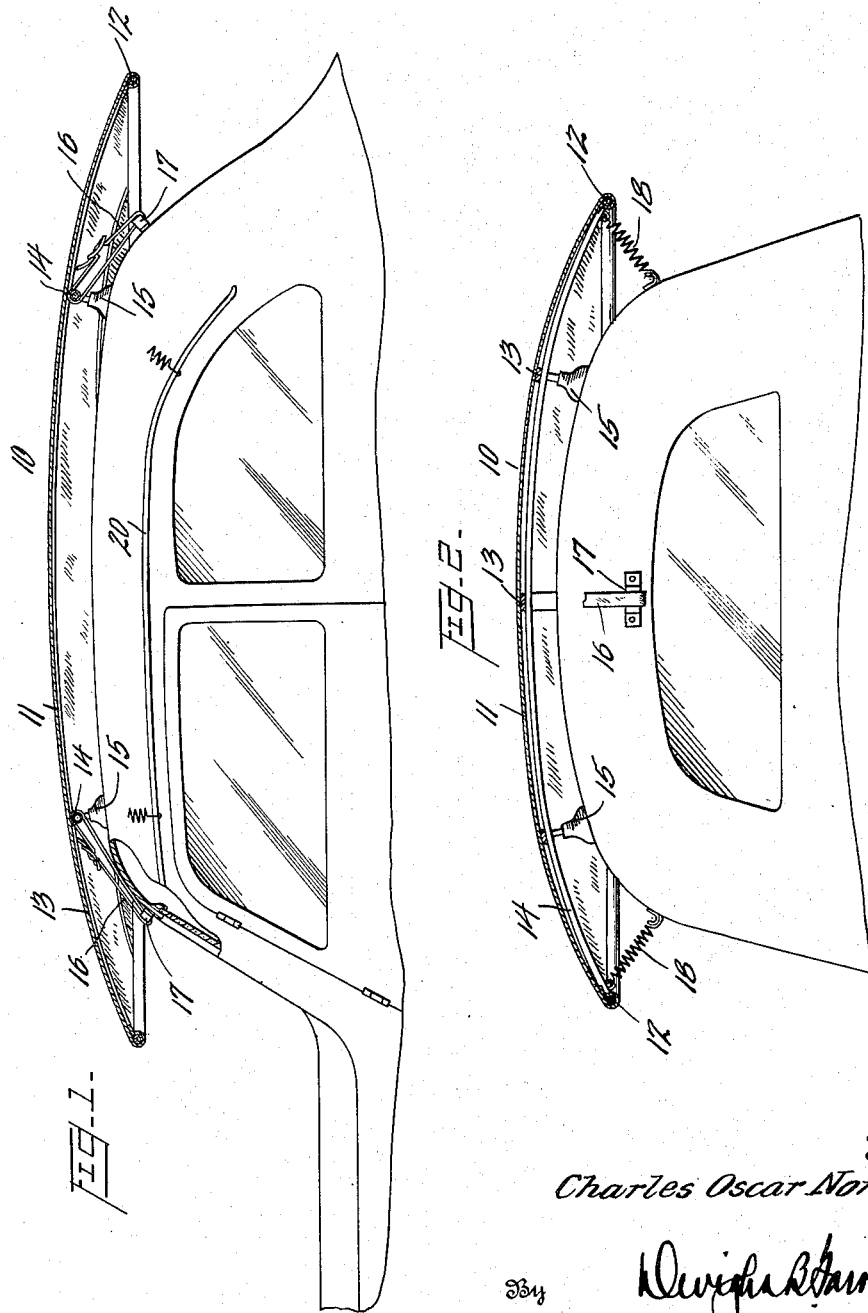
Inventor
Charles Oscar Norman,
By
Attorney Feb. 11, 1941.  C. O. NORMAN  2,231,293
VEHICLE CANOPY
Filed Oct. 12, 1939  2 Sheets-Sheet 2
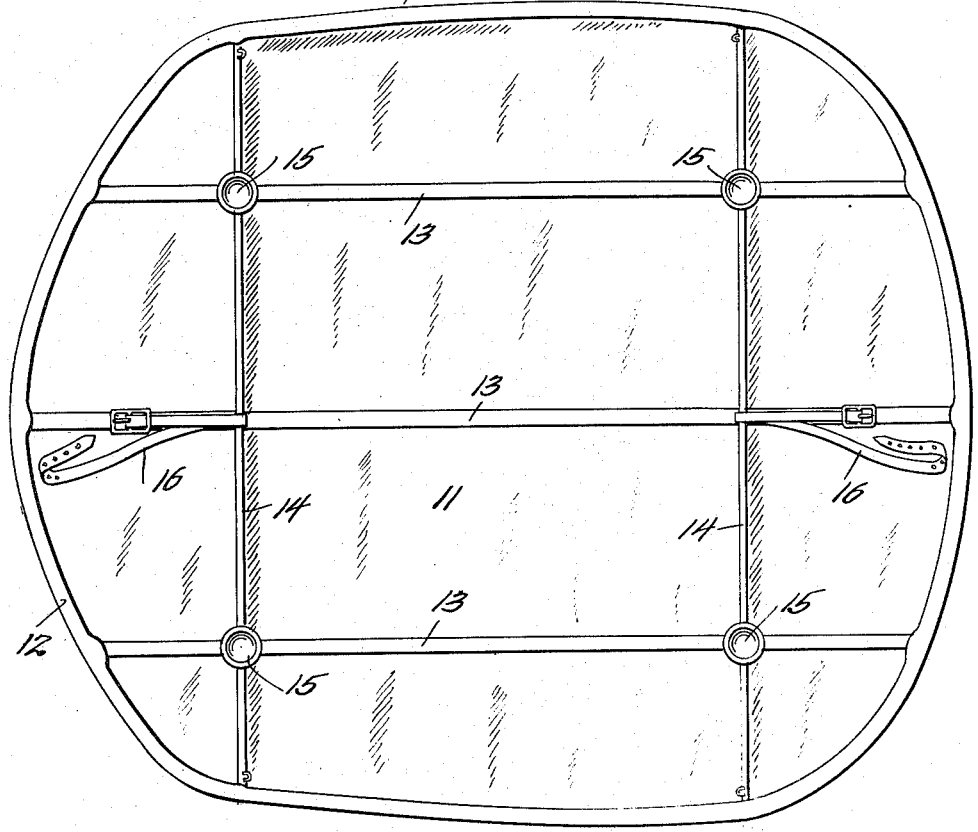
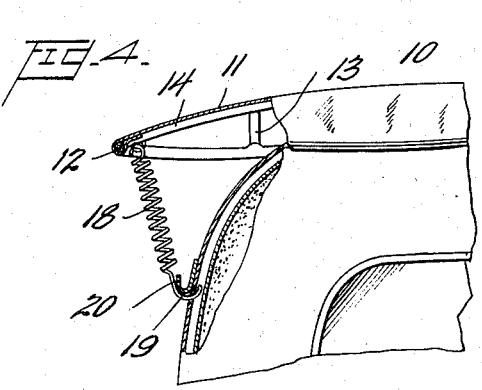
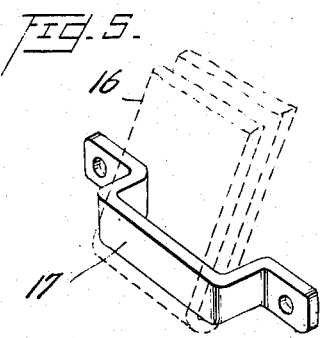
Inventor
Charles Oscar Norman
By
Attorney Patented Feb. 11, 1941

2,231,293

UNITED STATES PATENT OFFICE 2,231,293

VEHICLE CANOPY

Charles Oscar Norman, Montgomery, Ala.

Application October 12, 1939, Serial No. 299,207

1 Claim. (Cl. 296—137)

This invention relates generally to vehicle construction and particularly to the tops thereof.

The invention consists generally in a protector or shade to be applied to the roof of a vehicle in such manner as to provide an air space between the top and the roof, in order that the vehicle roof may be protected from the direct rays of the sun at all times as well as to enable a cooling current or draft of air to be maintained between the top and the roof when the vehicle is in motion.

The invention is further featured by a top so constructed as to shade the windshield and all windows of the vehicle, whereby road glare is minimized and the rays of the sun are prevented entering the car.

A further object of the invention is to provide a top of such construction as to preclude the entrance of rain to the vehicle when the windows are partly open, whereby to increase the comfort within the vehicle during inclement weather.

A still further and particular object of the invention is to provide a sun and weather shade as an attachment to the roofs of vehicles of standard construction, which may be quickly and easily applied to or removed from the vehicle, which does not require that the vehicle body or roof be modified, marred or defaced in its application, which is constructed in such manner as to resist damaging effects of wind, sun or rain, which is secured upon the vehicle in such manner as to be maintained rigidly therewith regardless of the speed attained by the vehicle, and which will prove thoroughly practical and efficient in accomplishing the results for which it is designed.

The invention will be more clearly understood with reference to the accompanying drawings, wherein:

Figure 1 is a side elevation, parts broken away, of a conventional form of motor vehicle and shown as applied thereto in longitudinal section a sun shade or umbrella constructed in accordance with the invention, Figure 2 is a rear elevation of the vehicle and illustrating the umbrella in transverse section, Figure 3 is a bottom plan view, on a slightly enlarged scale, of the umbrella detached from the vehicle, Figure 4 is a detail sectional view showing a preferred means for attaching a side of the shade to the motor vehicle body, and Figure 5 is a detail perspective view showing a type of loop or securing device for attaching the retaining straps for the shade.

As outlined above, it is the purpose of the invention to provide a sun shade or umbrella, so to speak, for the top of the vehicle, and while the invention is here described in association with the roof structure of an automobile or truck cab, it will be understood that the invention is not limited to such vehicles but may be employed with equally as satisfactory results upon boats or other types of vehicle. The invention here disclosed takes the form of an attachment for vehicle roofs, but by modification of the form here shown may be made a permanent part of the vehicle structure. The sun shade or umbrella may be formed of canvas or other stout cloth treated in such manner as to resist rain and moisture and to be impermeable to the sun's rays. It may, however, be formed of sheet metal, stamped or pressed into the required and desired shape and contour.

In carrying forth the invention in the form here shown, the sun shade, umbrella or top is indicated generally at 10, and comprises a suitable fabric 11 stretched tightly over a frame which includes a marginal or edge member 12 in the form of a pipe or bar of light weight but of sufficient strength and rigidity for the purposes. This frame will be of a shape in plan corresponding substantially to the plan of the vehicle roof with which it is to be associated, but the length and breadth of the frame will be greater than the corresponding dimensions of the vehicle roof. The frame 12 will be reinforced and stabilized by longitudinal bows 13 and lateral bows 14 preferably of tubular formation. These longitudinal and lateral members 13—14 are connected at their ends rigidly to the frame 12 and may also be rigidly secured together at their points of crossing or intersection. The longitudinal and lateral members 13 and 14 will be curved or bowed so as to conform substantially to the contour or curvature of the vehicle roof.

The top 10 has depending therefrom a plurality of posts 15, each of which is preferably formed at its lower end with an enlarged foot taking the form of a suction cup, and these posts are provided in numbers corresponding to the requirements. In many instances only four of these posts will be necessary, but a greater number may be used if desired. The posts are preferably arranged near the sides of the canopy or top and are of such height as to maintain the top spaced from the roof of the vehicle a distance sufficient to insulate the top from the roof by a substantial air space. The ends and sides of the top clear the corresponding parts of the vehicle roof by a sufficient distance to permit of ingress and egress of air in all directions.

As before stated, the top is of greater length and breadth than the roof structure of the vehicle with which it is used, in order that there may be a substantial overhang at the front and rear as well as at the sides of the vehicle. This is in order to protect the occupants of the vehicle from the direct rays of the sun, as well as to either eliminate or substantially reduce the road glare both in advance of and in the rear of the vehicle.

The means for securing the sun shade or canopy to the vehicle includes straps 16 secured firmly at one end to the frame structure of the top 10 and at their other ends to loops 17 firmly affixed to the roof structure of the vehicle at the front and rear parts of the roof. These loops may be small so as to be inconspicuous when applied to the vehicle, and are preferably located intermediate the sides of the vehicle and in alinement with one another longitudinally of the vehicle body. It will be observed that the straps 16 extend forwardly and rearwardly from the top 10 so that upon tightening the straps in the loops 17 the top is caused to stabilize itself firmly upon the supporting posts 15.

The top or shade 10 is stabilized against lateral displacement by tension members in the form of springs 18 at the sides of the top. These springs are secured at proper points along the length of the top and at the sides thereof so as to extend inwardly and downwardly therefrom and to firmly engage with the top of the vehicle. In practice, each spring is provided at its lower end with a hook 19 to engage in a suitable opening or recess formed in the vehicle body beneath the drip rail 20. These openings may be so located as to preclude the entrance of moisture or water therethrough.

By constructing the top and securing the same to the roof of a vehicle in the manner stated, it is apparent that the stresses upon the canopy in all directions are substantially equalized. The straps 16 rigidly maintain the top in place against any tendency of movement longitudinally of the vehicle, while the contractile springs at the sides of the top exert equal pressures inwardly and downwardly upon the supporting posts 15. The frame and the manner in which it is connected to the vehicle roof assures rigidity and stability notwithstanding violent air pressures to which it will be subjected in high speed traveling. The space provided between the canopy and the vehicle roof is such as to insulate the vehicle roof from the direct rays of the sun, while this space acts as an air channel for cooling drafts and currents during travel of the vehicle. The overhang of the top, front and rear eliminates road glare and protects the occupants of the car against direct sun rays, while the overhang at the sides not only protects the occupants against sun rays but insures against the entrance of rain through partly opened windows. This tends to more comfortable driving during inclement weather.

Having thus described my invention, what I claim as new and useful is:

An attachment for vehicles, comprising a top member of greater length and breadth than the roof of the vehicle, posts affixed to the underside of said top inwardly from the edges thereof and adapted to rest upon said roof and support the top in spaced relation thereto, suction cups on the lower ends of said posts to engage with the vehicle roof and to conform to any curvature thereof, strap members at the forward and rear portions of said top and adapted to be connected to the roof of the vehicle, and yieldable members secured to the lateral margins of said top to connect the latter to the side portions of the vehicle inwardly of the lateral edges of said top.

CHARLES OSCAR NORMAN.